United States Patent
Chaar et al.

(10) Patent No.: US 7,143,180 B2
(45) Date of Patent: Nov. 28, 2006

(54) SYSTEM AND METHOD FOR PROTECTING A TCP CONNECTION SERVING SYSTEM FROM HIGH-VOLUME OF TCP CONNECTION REQUESTS

(75) Inventors: Jarir K. Chaar, Tarrytown, NY (US); David A. George, Somers, NY (US); C. Steven Lingafelt, Durham, NC (US); Kiyoshi Maruyama, Chappaqua, NY (US); Mark Mei, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/931,225

(22) Filed: Aug. 16, 2001

(65) Prior Publication Data

US 2003/0037164 A1 Feb. 20, 2003

(51) Int. Cl.
*G06F 15/16* (2006.01)
(52) U.S. Cl. ............... 709/235; 709/224; 709/227
(58) Field of Classification Search ........ 709/223–237, 709/200, 203, 248; 713/201, 200; 370/236, 370/242, 389–394
See application file for complete search history.

(56) References Cited

U.S. PATENT DOCUMENTS

| | | | |
|---|---|---|---|
| 5,802,106 A * | 9/1998 | Packer | 375/225 |
| 6,178,450 B1 * | 1/2001 | Ogishi et al. | 709/224 |
| 6,424,624 B1 * | 7/2002 | Galand et al. | 370/231 |
| 6,609,205 B1 * | 8/2003 | Bernhard et al. | 713/201 |
| 6,725,378 B1 * | 4/2004 | Schuba et al. | 713/201 |
| 6,775,704 B1 * | 8/2004 | Watson et al. | 709/229 |
| 6,816,910 B1 * | 11/2004 | Ricciulli | 709/237 |
| 6,823,387 B1 * | 11/2004 | Srinivas | 709/227 |
| 6,851,062 B1 * | 2/2005 | Hartmann et al. | 726/22 |
| 6,958,997 B1 * | 10/2005 | Bolton | 370/392 |
| 2002/0075895 A1 * | 6/2002 | Yamaguchi et al. | 370/465 |
| 2002/0103916 A1 * | 8/2002 | Chen et al. | 709/229 |

* cited by examiner

*Primary Examiner*—Philip Tran
*Assistant Examiner*—Asad Muhammed Nawaz
(74) *Attorney, Agent, or Firm*—Michael J. Buchenhorner; Casey P. August

(57) ABSTRACT

To prevent system crashes, as by denial-of-service attacks, of TCP/IP (Transmission Control Protocol/Internet Protocol) networks, this invention regulates the volume of TCP connection requests that await service at a TCP/IP connection control table. For this purpose, the usage of the system is monitored on a dynamic basis, the time-out value $T_{ho}$ is dynamically computed, and requests that have been awaiting service for a period of time that exceeds $T_{ho}$ are removed from the TCP/IP connection control table.

3 Claims, 4 Drawing Sheets

Tho IS THE TIME-OUT USED
Tmin IS THE MINIMUM OF Tho
Tmax IS THE MAXIMUM OF Tho

Nlimit: THE NUMBER OF SAFELY USABLE ENTRIES IN TABLE

Nabs: THE ABSOLUTE BOUND OF Nsize

SYSTEM AND METHOD FOR PROTECTING A TCP CONNECTION SERVING SYSTEM FROM HIGH-VOLUME OF TCP CONNECTION REQUESTS

FIELD OF THE INVENTION

The present invention relates generally to the TCP/IP (Transmission Control Protocol/Internet Protocol) based networks and systems and more particularly to those systems and components that keeps TCP connection related status information, such as the TCP connection control table, for the management of connections. Those management may include serving, filtering, load balancing, routing, redirecting, etc. of TCP connections.

DESCRIPTION OF THE PRIOR ART

The TCP/IP is a foundation for the world's largest network, Internet, as well as for the intranet and extranet, and it has become the core for data/voice/video communications and streaming. It has also become the major default communications protocols for connecting variety of digital entities.

When a networked digital entity that keeps track of TCP connection states receives a very high-volume of legitimate and/or illegitimate TCP connection requests, it runs the risk of flooding its TCP connection-related tables, which often leads to system quiescence or system crash. Such digital entities include today's servers, storage area networks, network attached storage and clusters of such entities. Future entities may include memory subsystems, storage subsystems and more general I/O subsystems that can be independently deployed throughout the network to form the distributed components of a digital entity that are connected together via high-bandwidth networks.

It is known that the purpose of a SYN (synchronization) flood (i.e., sending of large volume of "false" TCP connection requests) is to create a large number of long-lasting half-open TCP connections to fill the TCP connection control table in order for no other new connection requests to be accepted. This is known as a denial of service attack. A half-open connection is a connection whose 3-way hand shake hasn't been completed yet.

Every TCP connection establishment will experience some time duration for the half-open state before the associated TCP connection has been established. The duration of the half-open state depends on a number of parameters. Some of them include the conditions of two parties, how far two parties are located, what networks are being used to connect these two parties, congestion of these networks, the speed at which these two parties are connected to networks, and whether or not the intent of connection establishment is "sincere". In general, the half-open duration of a TCP connection establishment is short and is usually less than a second or so. A TCP connection request (from now on, simply a request or requests) associated with the SYN flood, for example, will eventually time-out. A typical time-out value is anywhere between 60 seconds and 120 seconds. In this patent application, the term "legitimate" or "good" is used to reference a "sincere" TCP connection request, and the term "illegitimate" or "bad" is used to reference a "not-sincere" TCP connection request.

A simple way to avoid filling up the TCP connection control table is to start discarding (or redirecting) future requests once a certain threshold of table utilization has been reached. This approach works well when no differentiation among TCP connection requests is needed. Some of major problems of this approach are (1) there is no way to differentiate legitimate requests from illegitimate requests (a preferable approach is to discard illegitimate requests first and then legitimates requests next if needed) and (2) the implementation of this approach requires some modification of existing systems, thus making its deployment more difficult.

The way to determine whether or not a TCP connection request is legitimate is to accept the connection request (assuming the requester has a valid IP address and port number) and observe whether or not its TCP half-open connection state moves to the "connected" state or it simply faces the half-open time-out. Not every "timed-out" half-open request is illegitimate or "not sincere". However, it is a good practice to discard or reset those TCP connection requests that stay in the half-open state unreasonably long.

In the TCP/IP protocols, there is a time-out parameter for controlling the duration of the half-open state called "half-open time-out". $T_{ho}$ shall hereinafter denote this "half-open time-out". Clearly, by changing the value of $T_{ho}$, one can control the maximum duration for each TCP connection request to stay in the half-open state. Once a connection request faces its time-out, the corresponding entry will be removed from the control table. The removed TCP connection request could be either simply discarded or reset. Therefore, the management of $T_{ho}$ leads to the management of the use (or usage) of the TCP connection control table. The Lucent Access Point (AP) product (www.lucent.com/products) allows a user to choose one of two operation modes corresponding to the half-open time-out. One mode corresponding to a normal operation and another corresponding to a critical mode called "SYN Defender". This "SYN Defender" mode can be invoked to protect systems from SYN Flood type denial of service attacks. The SYN Defender mode uses a very small value for $T_{ho}$, thus limiting the life cycle of the half-open connection state for TCP connection request. The major limitations of this approach are that its operation mode is invoked manually, it supports only two states (normal and SYN Defender) and it is not adaptable to changes in operation environment.

BRIEF SUMMARY OF THE INVENTION

The object of this invention is to provide a system and method that protect a TCP connection serving system from high-volume of TCP connection requests (both good and bad) which often lead to system quiescence or crash by dynamically adjusting the half-open connection time-out $T_{ho}$, that is used to "clean up" the TCP connection control table. A $T_{ho}$ is defined for each TCP connection control table and it is dynamically adjusted. This invention has a means to observe the use (or usage) of the TCP connection control table(s), a means to compute the next $T_{ho}$, value and a means to inform the value to any existing TCP/IP "stack". The $T_{ho}$, value ranges between the minimum $T_{min}$ and the maximum $T_{max}$.

Another object of this invention is to make the system and method adaptable to different operating environment by dynamically adjusting the range $[T_{min}, T_{max}]$ in which $T_{ho}$ can operate. This invention has a means to derive both $T_{min}$ and $T_{max}$. Examples of operating environment of this invention include Internet, intranet, extranet, back-end network infrastructure, and storage area network.

Yet another object of this invention is to provide an optional means that can be used to further protect a system with the TCP connection control table by preventing from fully utilizing the TCP connection control table by providing a means to throttle newly arriving TCP connection requests in the event that the table utilization had reached a predetermined level.

Accordingly, the present invention broadly provides a method of regulating TCP/IP connection requests which await service in a system by a TCP/IP connection control table to prevent overload thereof, the aforesaid method comprising the steps of:

a) monitoring usage of the aforesaid system on a dynamic basis, b) based upon the aforesaid usage, dynamically computing a time-out value $T_{ho}$ which defines the time duration that a TCP connection request may await service by the system, c) removing from the aforesaid TCP/IP connection control table all TCP/IP connection requests which have been awaiting service in said TCP/IP stack for a duration exceeding $T_{ho}$ Preferably, the aforesaid TCP/IP connection control table has a size $N_{size}$ and an upper bound for usable table size of $N_{abs} \leq N_{size}$, and where values of $T_{ho}$ are dynamically computed in a range $[T_{min}, T_{max}]$ According to a preferred embodiment, the method according t a preferred embodiment of the invention comprises the steps of:

i) setting $T_{ho}=T_{min}$ when $N>N_{abs}$ ii) when $N>N_{limit}$ setting $T_{ho}=\max\{T_{min}, T'_{ho}/A\}$, where $T'_{ho}$ is a previously existing value of $T_{ho}$, where $A>1$, where N is the current usage of the table, and where $0 \leq N_{limit} \leq N_{size}$, and iii) when $N \leq N_{limit}$, setting $T_{ho}=\min\{T_{max}, A*T_{ho}\}$.

According to another preferred embodiment, the method comprises the steps of:

a) defining a plurality of table usage value $N_i$ spanning an increasing range of $N_1=0$ to $N_1=N_{size}$ b) associating a corresponding plurality of time durations $T_1$ spanning a decreasing range of $T_1=T_{max}$ to $T_1=T_{min}$, and c) comparing current table usage N to $N_1$ and setting $T_{ho}$ to a corresponding value $T_i$.

As an illustrative example, $T_{min}$ may have a value in a range of 0.01 to 1.0 secs. and $T_{max}$ may have a value in a range of 60 to 120 secs.

DETAILED DESCRIPTION OF THE INVENTION

Figure 1:
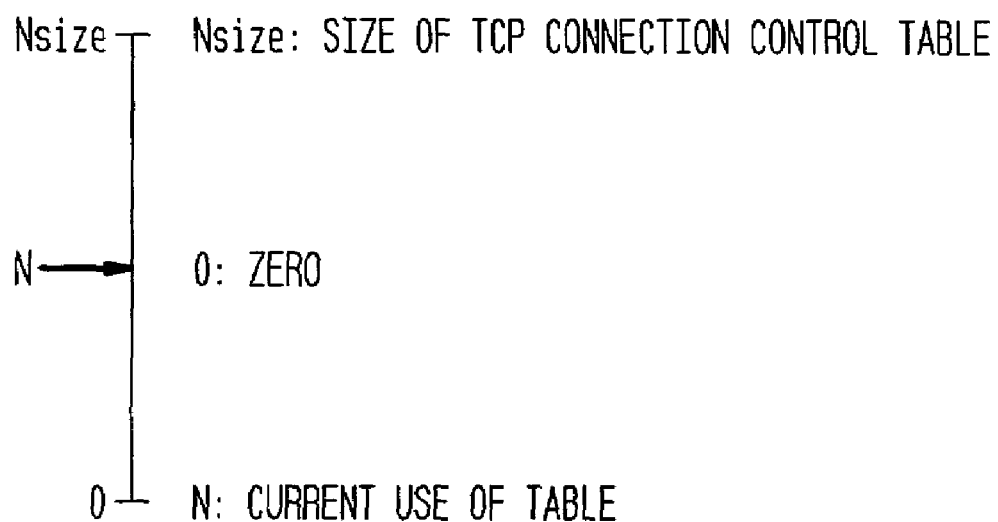
FIG. 1 illustrates the definition of the size of a TCP connection control table.

FIG. 1 illustrates the definition of the size of a TCP connection control table. The value $N_{size}$ represents the size of the table and N represents the current use of the table. N is bounded by 0 (zero) and $N_{size}$.

Figure 2:
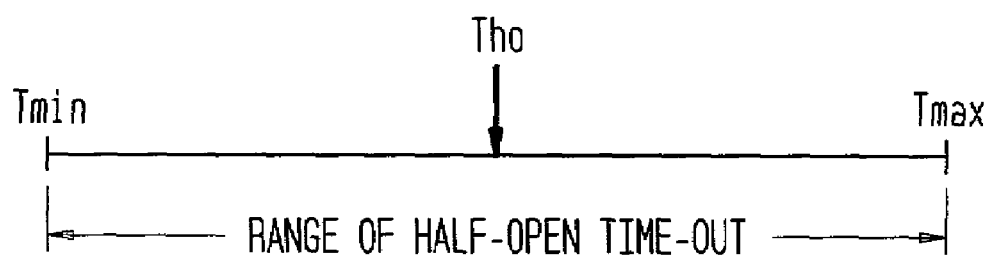
FIG. 2 illustrates an exemplary range of half-open time-out, $T_{ho}$

FIG. 2 illustrates the value range of the half-open time-out $T_{ho}$. $T_{ho}$ is bounded by the minimum time-out value $T_{min}$ and the maximum time-out value $T_{max}$. The $T_{min}$ value is usually less than 1 second and the $T_{max}$ value often used is either 60 seconds or 120 seconds depending on the installed TCP/IP stack.

Figure 3:
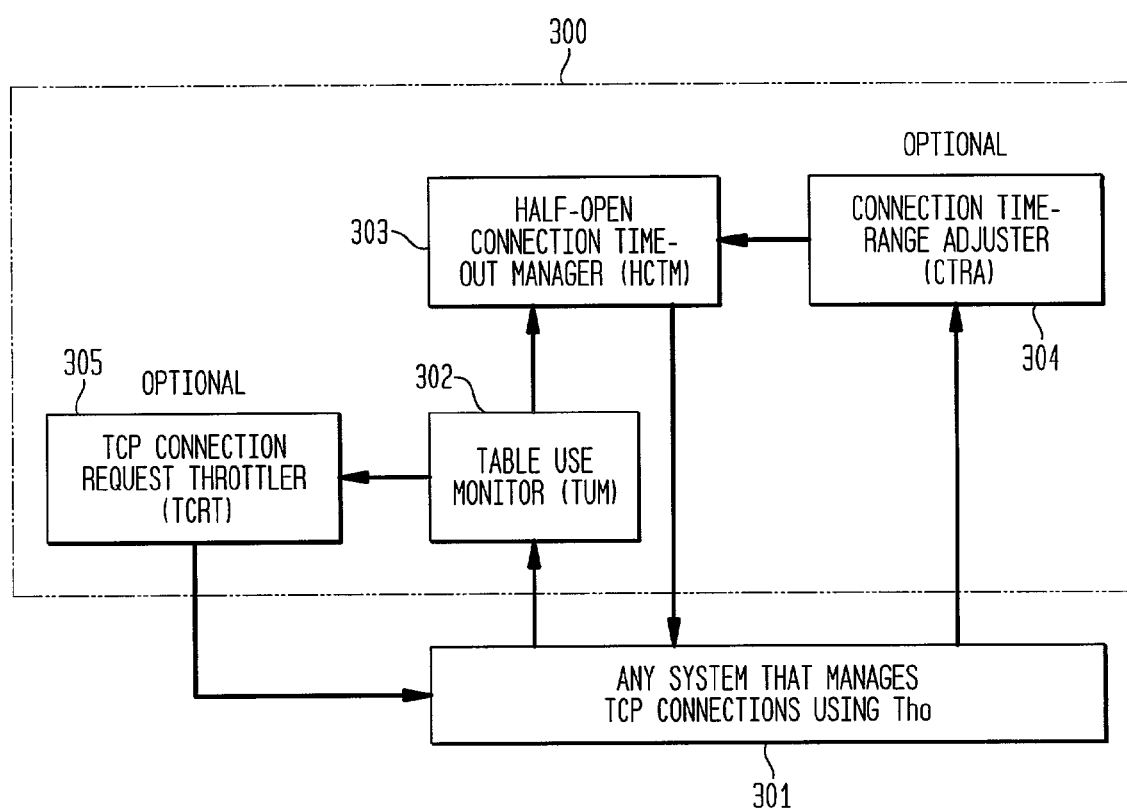
FIG. 3 illustrates the overall system and method, according to an embodiment of the invention

FIG. 3 illustrates the overall system and method of this invention. The invented system 300 interact with any existing system 301 that monitors the half-open TCP connections and manages them using the half-open connection time-out $T_{ho}$. Table Use Monitor (TUM) 302 monitors the use or usage of the TCP connection control table in a system 301. Half-open Connection Time-out Manager (HCTM) 303 computes the new value for $T_{ho}$ using the table use information made available by Table Use Monitor (TUM) 302, and then it informs the new value $T_{ho}$ to a system 301. Algorithms for computing $T_{ho}$ are described later. The components 302 and 303 are required components. Connection Time Range Adjuster (CTRA) 304 is an optional component and it re-computes the time range $[T_{min}, T_{max}]$. CTRA 304 makes the invented system and method adaptable to different operating environments. CTRA 304 continuously monitors the shortest duration $T_{short}$ of any half-open TCP connection and the longest duration $T_{long}$ of any half-open TCP connection that didn't time-out. After observing $T_{short}$ and $T_{long}$, $T_{min}$ is set to $T_{short}$ and $T_{max}$ is set to $T_{long}$, respectively. TCP Connection Request Throttler (TCRT) 305 is another optional component. The responsibility of this component is to discard or reset any newly arriving TCP connection requests had the table use level reached a predefined level of usage or use. TCRT 305 operations can be performed for every newly arriving TCP connection request by checking the current TCP connection table usage in a system 301.

Figure 4:
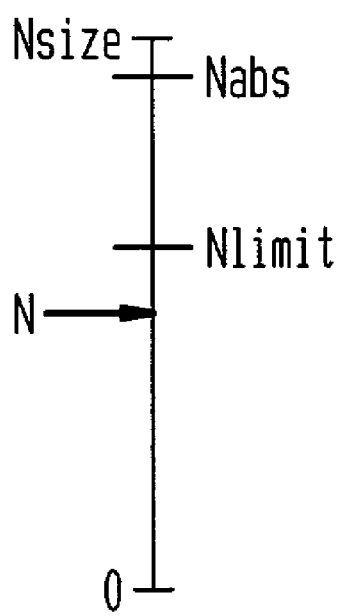
FIG. 4 illustrates a preferred algorithm that is used for managing the half-open connection time-out, $T_{ho}$.

FIG. 4 describes a preferred algorithm HCTM1 for computing the half-open time-out $T_{ho}$. In this algorithm, two thresholds $N_{limit}$ and $N_{abs}$ are used. Here, $N_{limit}$ is always less than $N_{abs}$. $N_{limit}$ indicates the number of "safely" usable entries in the TCP connection control table and its value is between 0 (zero) and the table size $N_{size}$. A reasonable $N_{limit}$ value is between 50% and 90% of $N_{size}$. $N_{abs}$ indicates the "absolute" bound and a reasonable value is between 90% and 99% of $N_{size}$. Algorithm HCTM1 uses these two thresholds for computing $T_{ho}$. Algorithm HCTM1 repeats the following computation periodically. This period is preferably on the order of a second. If N is greater than $N_{abs}$, then $T_{ho}$ is immediately set to the minimum value $T_{min}$ to protect a system. If N is less than or equal to $N_{abs}$ and if N is greater than $N_{limit}$, then $T_{ho}$ is reduced by setting it to $\max\{T_{min}, T_{ho}/A\}$. The max function is used to make sure that the value of $T_{ho}$ will never be less than the minimum bound $T_{min}$. Here, A is a parameter called "acceleration" and is either a constant (e.g., 2) or a variable. The value of A must be greater than 1 (one). If N is less than or equal $N_{limit}$, then $T_{ho}$ is increased to $\min\{T_{max}, A*T_{ho}\}$. The min function is used to make sure that the value of $T_{ho}$ never exceeds the maximum value $T_{max}$. The value for A may be computed from the following: 1ct $n=n_1|n_2$ where $n_1$ indicates the number of times N has exceeded $N_{limit}$ in the last n observed cycles. Then, A can be set to as a function of $2*(n_1/n_2)$.

Figure 5:
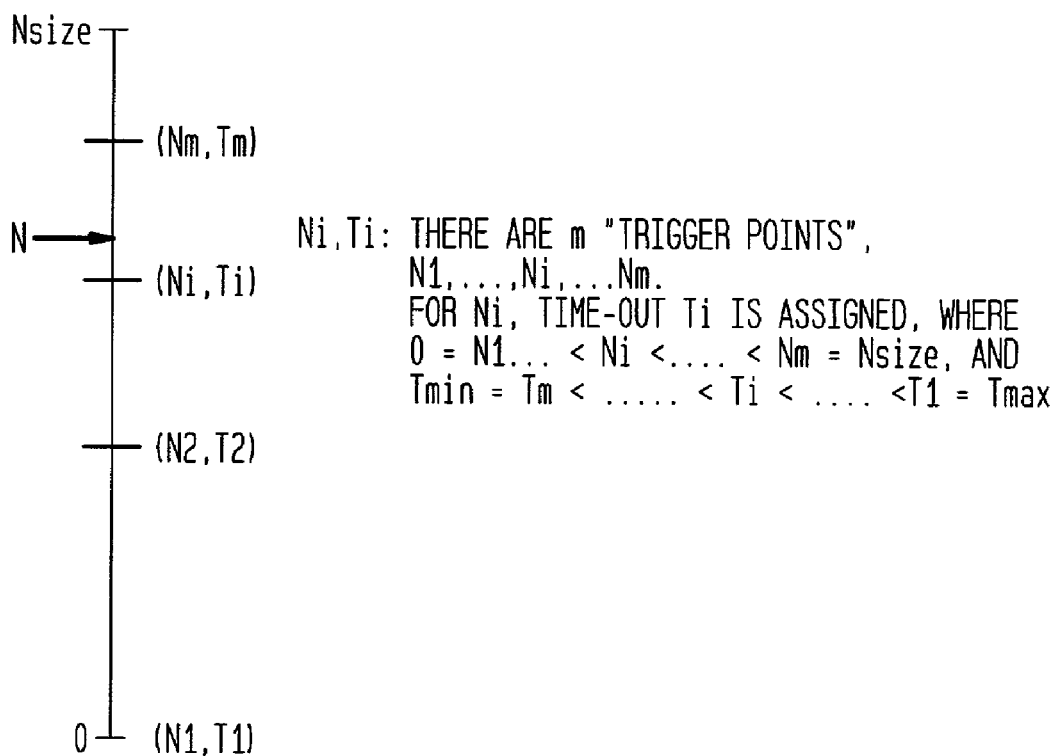
FIG. 5 illustrates another algorithm that can be used for managing the half-open connection time-out, $T_{ho}$.

FIG. 5 illustrates yet another algorithm, Algorithm HCTM2, that can be used to compute the half-open time-out $T_{ho}$ in the Half-open Connection Time-out Manager (HCTM) component 303 in FIG. 3. There are m thresholds called "trigger points", $N_1, N_2, \ldots N_i, \ldots N_m$, and are in increasing order where $N_1$ is the smallest and $N_m$ is the largest. For each trigger point $N_i$, a half-open time-out $T_1$ is assigned, where $T1=T_{max}$, and $T_m=T_{min}$. Algorithm HCTM2 will repeat the following step periodically, just like Algorithm HCTM1 does. When the observed value N crosses over $N_1$ (i.e., N is between $N_1$ and $N_{1+i}$), the half-open time-out $T_{ho}$ is set to $T_i$.

While the present invention has been described with reference to preferred embodiments thereof, numerous obvious changes and variations may readily be made by persons skilled in the field of internet and other communications. Accordingly, the invention should be understood to include all such variations to the full extent embraced by the claims.

What is claimed is:

1. A method of regulating TCP/IP connection requests which await service in a system by a TCP/IP connection control table to prevent overload thereof, said method comprising the steps of:

monitoring usage of said system on a dynamic basis, based upon said usage, dynamically computing a time-out value $T_{ho}$ which defines the time duration that a TCP connection request may await service by said system, removing from said TCP/IP connection control table all TCP/IP connection requests which have been awaiting service in said TCP/IP stack for a duration exceeding $T_{ho;\ and}$ setting $T_{ho}=T_{min}$ when $N>N_{abs}$, when $N>N_{limit}$ setting $T_{ho}=\max\{T_{min}, T'_{ho}/A\}$, where $T'_{ho}$ is a previously existing value of $T_{ho}$, where $A>1$, where N is the current usage of the table, and where $0\leq N_{limit}\leq N_{size}$, and when $N\leq N_{limit}$, setting $T_{ho}=\min\{T_{max}, A*T'_{ho}/A\}$;

wherein said TCP/IP connection control table has size $N_{size}$ and an upper bound for usable table size of $N_{abs}\leq N_{size}$, and where values of $T_{ho}$ are dynamically computed in a range $[T_{min}, T_{max}]$.

2. A method as set forth in claim 1, comprising the steps of:

a) defining a plurality of table usage value $N_i$ spanning an increasing range of $N_i=0$ to $N_i=N_{size}$, b) associating a corresponding plurality of time durations $T_i$ spanning a decreasing range of $T_i=T_{max}$ to $T_{i=Tmin}$, and c) comparing current table usage N to $N_{ho}$ and setting $T_{ho}$ to a corresponding value $T_i$.

3. A method as set forth in claim 1, wherein $T_{min}$ has a value in a range of 0.01 to 1.0 secs. and wherein $T_{max}$ has a value in a range of 60 to 120 secs.

* * * * *